(12) United States Patent
Bang et al.

(10) Patent No.: US 12,129,417 B2
(45) Date of Patent: Oct. 29, 2024

(54) III-V-BASED QUANTUM DOT AND METHOD OF MANUFACTURING SAME

(71) Applicants: DUKSAN NEOLUX CO., LTD., Cheonan-si (KR); UNIST (ULSAN NATIONAL INSTITUTE OF SCIENCE AND TECHNOLOGY), Ulsan (KR)

(72) Inventors: Eun Byul Bang, Ulsan (KR); Do Eon Kim, Ulsan (KR); Yun Hee Park, Ulsan (KR); Jong Nam Park, Seoul (KR); Kang Yong Kim, Busan (KR); Yong Hoon Choi, Busan (KR)

(73) Assignees: DUKSAN NEOLUX CO., LTD., Cheonan-si (KR); ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 150 days.

(21) Appl. No.: 17/601,648

(22) PCT Filed: Apr. 7, 2020

(86) PCT No.: PCT/KR2020/004701
§ 371 (c)(1),
(2) Date: Oct. 5, 2021

(87) PCT Pub. No.: WO2020/209580
PCT Pub. Date: Oct. 15, 2020

(65) Prior Publication Data
US 2022/0154071 A1 May 19, 2022

(30) Foreign Application Priority Data

Apr. 11, 2019 (KR) .................. 10-2019-0042756
Apr. 7, 2020 (KR) .................. 10-2020-0042059

(51) Int. Cl.
*C09K 11/88* (2006.01)
*C09K 11/08* (2006.01)
(Continued)

(52) U.S. Cl.
CPC ........ *C09K 11/883* (2013.01); *C09K 11/0883* (2013.01); *B82Y 20/00* (2013.01); *B82Y 40/00* (2013.01)

(58) Field of Classification Search
CPC ..................... C09K 11/0883; C09K 11/883
See application file for complete search history.

(56) References Cited

U.S. PATENT DOCUMENTS

2007/0194279 A1* 8/2007 Peng .................... C09K 11/584
977/773
2010/0159248 A1* 6/2010 Jang ....................... C09K 11/70
977/774

(Continued)

FOREIGN PATENT DOCUMENTS

KR  10-2010-0071700 A  6/2010
KR  10-2012-0089251 A  8/2012

(Continued)

OTHER PUBLICATIONS

Moghaddam, E. et al., "Investigation of Ultrasonic Effect on Morphology, Optical and Growth Properties of ZnO Quantum Dots", Journal of Nano Research, vol. 49, Trans Tech Publications, Ltd., Sep. 2017, pp. 10-17.

(Continued)

*Primary Examiner* — Matthew E. Hoban
(74) *Attorney, Agent, or Firm* — Benesch Friedlander Coplan & Aronoff LLP

(57) ABSTRACT

A technology disclosed in the present disclosure provides a Group III-V-based quantum dot including a seed which includes a Group III element, a Group V element, and an (Continued)

active metal having various oxidation numbers and in which a molar ratio of the Group III element and the active metal is 1:3 to 1:30, and a method of manufacturing the same.

10 Claims, 2 Drawing Sheets

(51) Int. Cl.
  *B82Y 20/00*  (2011.01)
  *B82Y 40/00*  (2011.01)

(56) References Cited

U.S. PATENT DOCUMENTS

| | | | |
|---|---|---|---|
| 2014/0264172 A1* | 9/2014 | Daniels | B01J 2/003 |
| | | | 252/301.6 S |
| 2018/0327664 A1* | 11/2018 | Houtepen | C09K 11/62 |
| 2020/0291293 A1* | 9/2020 | Han | C09K 11/70 |

FOREIGN PATENT DOCUMENTS

| | | |
|---|---|---|
| KR | 10-2017-0018468 A | 2/2017 |
| KR | 10-1904968 B1 | 10/2018 |

OTHER PUBLICATIONS

Brown, R. P. et al., "Synthesis and Degradation of Cadmium-Free InP and InPZn/ZnS Quantum Dots in Solution", Langmuir 2018, 34, 46, 13924-13934, Publication Date:Oct. 23, 2018.

\* cited by examiner

III-V-BASED QUANTUM DOT AND METHOD OF MANUFACTURING SAME

BACKGROUND OF THE DISCLOSURE

1. Field of the Disclosure

The present disclosure relates to a III-V-based quantum dot and a method of manufacturing the same.

2. Description of the Related Art

Quantum dots (QD) are semiconducting nano-sized particles having a three-dimensionally limited size and exhibit excellent optical and electrical properties that semiconducting materials do not have in a bulk state. For example, even when quantum dots include the same material, the color of the emitted light may vary depending on the size of the particle. Due to these characteristics, quantum dots are attracting attention as a next-generation high-brightness light emitting diode (LED), bio sensor, laser, and solar cell nano material.

Further, quantum dots have various advantages compared to commonly used organic material-based fluorescent dyes. Various spectra may be emitted from the quantum dots of the same composition through the quantum restriction effect by size control, and it is possible to secure a very high quantum efficiency of up to 80% and an emission spectrum having very good color purity compared to dyes of organic materials. Moreover, since the quantum dot is an inorganic-based semiconductor composition, it is possible to secure better light stability by 100 to 1000 times compared to organic-based fluorescent dyes.

A quantum dot using a Group II-VI compound semiconductor composition including Group II and Group VI elements on the periodic table is a material capable of emitting light in the visible region with high luminous efficiency and light stability, and has been studied the most.

Research on the representative Group II-VI compound semiconductor quantum dot has attracted a lot of attention due to merits such as high luminous efficiency and stability, but the quantum dot contains Cd2+ and Se2−, which cause serious problems in terms of environmental hazard and toxicity. Further, when the quantum dot is applied to the bio field, the quantum dot may have a harmful effect on the human body, so recently, a III-V-based compound semiconductor quantum dot that is capable of replacing the Group II-VI quantum dot has been increasingly studied.

However, in the case of typical Group III-V semiconductor nanocrystals, substances ranging from precursors thereof to the nanocrystals obtained therefrom are sensitive to oxygen and moisture, and the synthesis process thereof is not simple.

Further, it is not easy to adjust the growth rate of the nanocrystals, so the emission wavelength region is limited, and color purity is low due to various size distributions. Accordingly, the application to light emitting devices is limited. Therefore, the development of a new material capable of reducing the sensitivity to oxygen and moisture is required. Further, there is an urgent need to develop a technology capable of controlling the growth rate of nanocrystals and growing the nanocrystals in a uniform size.

Prior Art Document (Patent Document 1) Korean Patent No. 10-1462658 (Registered on 2014 Nov. 11)
(Patent Document 2) Korean Laid-Open Patent Application No. 10-2018-0095955 (Published on 2018 Aug. 28)

SUMMARY OF THE DISCLOSURE

An objective of an aspect of the present disclosure is to provide an active nanocluster used for synthesizing a III-V-based quantum dot having an improved full width at half maximum (FWHM) and high quantum efficiency.

An objective of another aspect of the present disclosure is to provide a method of manufacturing the above-described active nanocluster.

An objective of another aspect of the present disclosure is to provide a III-V-based quantum dot having an improved full width at half maximum (FWHM) and high quantum efficiency using an active nanocluster.

An objective of another aspect of the present disclosure is to provide a III-V-based quantum dot having an improved full width at half maximum (FWHM) and high quantum efficiency.

An objective of another aspect of the present disclosure is to provide a method of manufacturing the above-described Group III-V-based quantum dot.

According to an aspect of the present disclosure, there is provided an active nanocluster including an active metal oxide-carboxylate.

According to another aspect of the present disclosure, there is provided a quantum dot including the above-described active nanocluster.

According to another aspect of the present disclosure, there is provided a Group III-V-based quantum dot including a seed which includes a Group III element, a Group V element, and an active metal having various oxidation numbers and in which a molar ratio of the Group III element and the active metal is 1:3 to 1:30.

According to another aspect of the present disclosure, there is provided a method of manufacturing a Group III-V-based quantum dot. The method includes a precursor step of forming an active nanocluster including an active metal oxide-carboxylate obtained by performing thermal decomposing of an active metal-carboxylate, and a seed forming step of injecting Group III element precursor and Group V element precursor solutions into a precursor solution manufactured in the precursor step to thus form a seed in which an active metal, a Group III element, and a Group V element are alloyed.

According to another aspect of the present disclosure, there is provided a Group III-V-based quantum dot. The Group III-V-based quantum dot includes a bandgap control layer that includes a seed including a Group III element and a Group V element, and a growth layer including a Group III element and a Group V element formed on the outer surface of the seed. An active metal having various oxidation numbers is included in at least one of the seed and the growth layer constituting the bandgap control layer.

According to another aspect of the present disclosure, there is provided a Group III-V-based quantum dot. The Group III-V-based quantum dot includes a seed which includes a Group III element, a Group V element, an active metal having various oxidation numbers, and which is doped with one or more additional elements selected from the group consisting of Al, Ga, Ti, Mg, Na, Li, and Cu. In the quantum dot, the emission wavelength is 500 to 650 nm, and the full width at half maximum is 50 nm or less.

According to another aspect of the present disclosure, there is provided a Group III-V-based quantum dot. The Group III-V-based quantum dot includes a seed which includes a Group III element, a Group V element, an active metal having various oxidation numbers, and one or more additional elements selected from the group consisting of Al, Ga, Ti, Mg, Na, Li, and Cu. The raw material of the active metal is an active nanocluster solution including a compound represented by the following Chemical Formula 1.

$$T_xO_y(\text{carboxylate})_z \quad \text{[Chemical Formula 1]}$$

In Chemical Formula 1, T is selected from the group consisting of Zn, Mn, Cu, Fe, Ni, Co, Cr, Ti, Zr, Nb, Mo, Ru, and a combination thereof, x, y, and z are natural numbers, and x is greater than y.

According to another aspect of the present disclosure, there is provided a method of manufacturing a Group III-V-based quantum dot. The method includes a precursor step of forming an active nanocluster including an active metal oxide-carboxylate obtained by performing thermal decomposing of an active metal-carboxylate, and a seed forming step of injecting a solution including a Group III element precursor, a Group V element precursor, and one or more additional elements selected from the group consisting of Al, Ga, Ti, Mg, Na, Li, and Cu into a precursor solution manufactured in the precursor step to thus form a seed in which an active metal, a Group III element, and a Group V element are alloyed and which includes the additional elements.

The active nanocluster according to an aspect of the present disclosure efficiently forms a quantum dot and suppresses rapid saturation of the growth of the quantum dot, thereby improving a full width at half maximum and increasing a quantum efficiency.

The active nanocluster according to another aspect of the present disclosure is effectively manufactured by thermally decomposing the active metal-carboxylate by heating for a predetermined period of time.

Further, a III-V-based quantum dot according to another aspect of the present disclosure suppresses rapid precursor depletion, so a full width at half maximum (FWHM) is improved and a high quantum efficiency is obtained.

Further, a method of manufacturing a III-V-based quantum dot according to another aspect of the present disclosure has a merit in that since a highly reactive reaction medium is synthesized through simple thermal decomposition, the method is more suitable for mass production compared to a conventional method of synthesizing a high-efficiency quantum dot.

Further, in a Group III-V-based quantum dot according to another aspect of the present disclosure, lattice mismatch is reduced by injecting a solution including one or more additional elements selected from the group consisting of Al, Ga, Ti, Mg, Na, Li, Sn, and Cu, and the surface defects in the seed are controlled to thus improve the full width at half maximum (FWHM) and increase the quantum efficiency.

BRIEF DESCRIPTION OF THE DRAWINGS

The above and other objectives, features, and advantages of the present disclosure will be more clearly understood from the following detailed description taken in conjunction with the accompanying drawings, in which.

DESCRIPTION OF THE PREFERRED EMBODIMENTS

Figure 1:
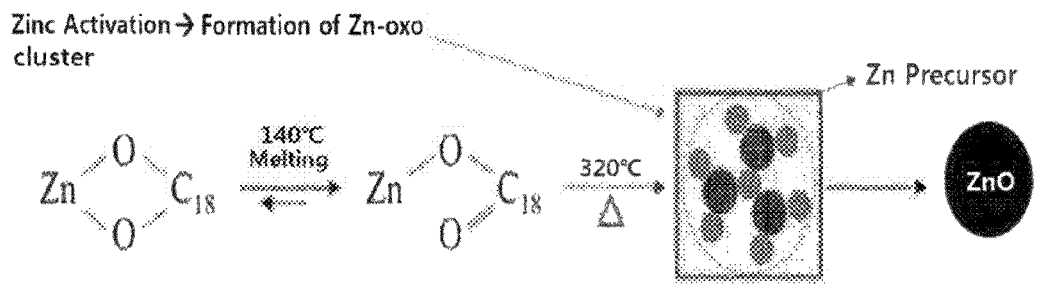
FIG. 1 is a mimetic view showing a method of manufacturing an active nanocluster according to an aspect of the present disclosure.

Hereinafter, a method of manufacturing an active nanocluster and a quantum dot according to an embodiment of the present disclosure will be described in detail with reference to the accompanying drawings. The present disclosure may be embodied in many different forms and is not limited to the embodiments described herein.

In order to clearly explain the present disclosure, parts irrelevant to the description are omitted, and the size and thickness of each component shown in the drawings are arbitrarily indicated for convenience of description, so the present disclosure is not necessarily limited as shown. In the drawings, the thicknesses are enlarged in order to clearly express various layers and regions. In addition, in the drawings, for convenience of description, the thicknesses of some layers and regions are exaggerated.

Further, when a part, such as a layer, film, region, or plate, is said to be "on" or "over" another part, it includes not only cases where it is "directly on" another part, but also cases where there is another part therebetween. Conversely, when a part is said to be "directly on" another part, it means that there is no other part therebetween. Further, when a part is said to be "on" or "over" the reference part, it means that the part is located on or under the reference part, and it does not mean that the part is necessarily located "on" or "over" the reference part in the direction opposite to gravity.

Further, throughout the specification, when a part is said to "include" a certain component, it means that other components may be further included, rather than excluding other components, unless otherwise stated.

Further, throughout the specification, a "planar view" means a view obtained when the target part is viewed from above, and a "cross-sectional view" means a view obtained when the cross-section obtained by vertically cutting the target part is viewed from the side.

In the present disclosure, an "active metal precursor" is a chemical material manufactured in advance to react an active metal, and is a concept that refers to all compounds containing an active metal.

<First Aspect of the Present Disclosure>

A first aspect of the present disclosure is an active nanocluster including an active metal oxide-carboxylate. In the present disclosure, an active metal refers to a metal which is included in a seed, an active layer, and a shell to ensure an activity of improving a full width at half maximum and contributing to the improvement of quantum efficiency when a quantum dot is manufactured and which is capable of being used as a metal in a metal oxide-carboxylate.

As the active metal, at least one selected from the group consisting of Zn, Mn, Cu, Fe, Ni, Co, Cr, Ti, Zr, Nb, Mo, Ru, and a combination thereof, which has various oxidation numbers, may be used.

Further, the active metal oxide is an oxide of an active metal selected from the group consisting of Zn, Mn, Cu, Fe, Ni, Co, Cr, Ti, Zr, Nb, Mo, Ru, and a combination thereof, and in the present disclosure, the active nanocluster may include the active metal oxide alone or two or more active metal oxides mixed with each other.

In the present disclosure, a "cluster" refers to particles in which hundreds to thousands of single atoms, molecules, or other types of atoms are aggregated or combined. For example, the average particle diameter of the cluster is preferably 1.5 nm or less, and more preferably, the lower limit of the average particle diameter is 0.5 nm because rapid saturation of the growth of the quantum dot is suppressed.

The active nanocluster includes an active metal oxide-carboxylate. The active metal oxide-carboxylate includes a compound represented by the following Chemical Formula 1.

$$T_xO_y(\text{carboxylate})_z \qquad \text{[Chemical Formula 1]}$$

In the above Chemical Formula, T is an active metal, carboxylate is a salt or ester of a carboxylic acid, the salt of the carboxylic acid has the general formula of M(RCOO)n, carboxylate ester has the general formula of RCOOR', M is a metal, n is a natural number, and R and R' are organic groups other than hydrogen.

x, y, and z are natural numbers, x is greater than y, and x+y=z or 2x=2y+z.

Further, the active metal oxide-carboxylate may include two or more kinds of active metal oxides having different values of x.

For example, the value of x of the two or more kinds of active metal oxides that are different from each other may be 2 to 10.

The two or more active metal oxides having different values of x may each satisfy the relationship of x+y=z. Examples thereof may include $Zn_4O$ (carboxylate)$_5$ and $Zn_7O_2$ (carboxylate)$_9$.

The two or more active metal oxides having different values of x may each satisfy the relationship of 2x=2y+z. Examples thereof may include $Zn_4O$ (carboxylate)$_6$ and $Zn_7O_2$ (carboxylate)$_{10}$.

The term "active nanocluster" used in the present disclosure refers to an active metal oxide-carboxylate.

For reference, in the case of the active metal oxide, the active metal precursor and carboxylic acid are reacted to synthesize an active metal-carboxylate, the active metal-carboxylate is thermally decomposed to be completely converted into the active metal oxide particle form via the active metal oxide-carboxylate form, and this active metal oxide is typically used.

Meanwhile, the present disclosure may provide a technical feature in which a solution including the active metal oxide-carboxylate (hereinafter, referred to as an active nanocluster solution) is formed through multi-step control of the thermal decomposition temperature and the active nanocluster solution is used as a raw material of the active metal oxide.

Unlike the prior art, it is possible to manufacture a quantum dot having an alloy bond between a Group III element and a Group V element by using the active nanocluster solution. As a result, the full width at half maximum (FWHM) is improved, the quantum efficiency is increased, and the growth of the quantum dot is prevented from being rapidly saturated, thereby providing the effect of efficiently growing the quantum dot.

The active nanocluster solution includes the active metal oxide-carboxylate and the active metal-carboxylate.

For example, in the case where zinc is used as the active metal, Zn oleate is first synthesized using the reaction of Zn acetate, which is an active metal precursor, and an oleic acid as a carboxylate. When the Zn oleate is thermally decomposed by temperature control in two steps, active nanoclusters such as $Zn_4O$(carboxylate)$_5$, $Zn_7O_2$(carboxylate)$_9$, $Zn_4O$(carboxylate)$_6$, and $Zn_7O_2$(carboxylate)$_{10}$ are synthesized, and ZnO nanoparticles are obtained as a final reactant. Therefore, before the Zn oleate is completely converted into the ZnO nanoparticles, the active metal oxide-carboxylate as the active nanocluster is present while being mixed with unreacted Zn oleate (corresponding to the active metal-carboxylate described above) in the solution.

Figure 2:
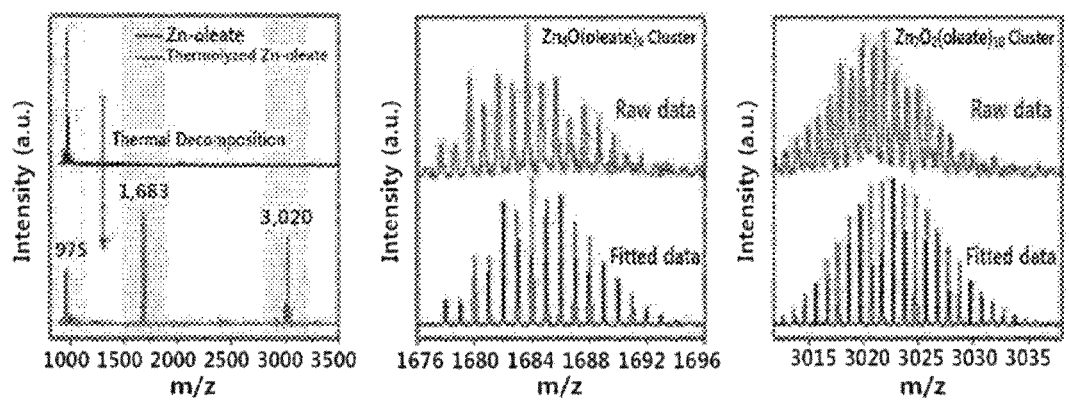
FIG. 2 is a graph showing MALDI-TOP (matris assisted laser desorption-time of flight) data obtained from the solution manufactured in Example 1 in order to confirm the active nanocluster according to an aspect of the present disclosure.

In practice, the content ratio of the active metal oxide-carboxylate and the active metal-carboxylate included in the active nanocluster solution can be confirmed by measuring the change in weight according to the activation of the active metal precursor. For example, referring to FIG. 2 showing the results measured using MALDI-TOP (matris assisted laser desorption-time of flight), when the activation is performed, peaks can be confirmed at not only 975 m/z appearing even in a conventional black graph, but also at 1683 m/z and 3020 m/z as in a red graph. As a result of calculating the abundance ratio by integrating each peak to compare areas with each other, it was confirmed that the mass distribution occupied by the 1683 m/z and 3020 m/z peaks representing $Zn_4O$(carboxylate)$_6$ and $Zn_7O_2$(carboxylate)$_{10}$, respectively, is about 80% of the total peaks.

That is, in this aspect, the mass distribution of the active metal oxide-carboxylate is higher than that of the active metal-carboxylate, and the active metal oxide-carboxylate and the active metal-carboxylate are preferably included at a ratio of 60:40 to 99:1.

That is, the active nanocluster serves to improve the full width at half maximum (FWHM) and increase the quantum efficiency when the quantum dot is manufactured. Further, the rapid saturation of the growth of the quantum dot is suppressed, so that the quantum dot grows efficiently. That is, the full width at half maximum of the quantum dot is, for example, 50 nm or less, preferably 30 to 45 nm, and more preferably 34 to 45 nm.

Second Aspect of the Present Disclosure

The second aspect of the present disclosure shows a method of manufacturing an active nanocluster including an active metal oxide-carboxylate obtained by using an active metal-carboxylate.

In other words, after the active metal precursor is reacted with a carboxylic acid to manufacture the active metal oxide-carboxylate, the active metal oxide-carboxylate is thermally decomposed to manufacture the active nanocluster. Specifically, the manufacturing method includes steps 1-1, 1-2, 1-3, and 1-4. The name of each stage is a name given to distinguish each stage from other stages, and does not include all technical meanings of each stage.

The step 1-1 is a step of mixing the active metal precursor and the carboxylic acid and then performing a pressure reduction.

When the active metal is zinc, examples of the active metal precursor may include one or more selected from the group consisting of dimethyl zinc, diethyl zinc, zinc acetate, zinc acetate dihydrate, zinc acetylacetonate, zinc acetylacetonate hydrate, zinc iodide, zinc bromide, zinc chloride, zinc fluoride, zinc fluoride tetrahydrate, zinc carbonate, zinc cyanide, zinc nitrate, zinc nitrate hexahydrate, zinc oxide, zinc peroxide, zinc perchlorate, zinc perchlorate hexahydrate, zinc sulfate, diphenyl zinc, zinc naphthalate, zinc oleate, and zinc stearate.

Even in the case where the active metal is not zinc, the same may be applied.

The carboxylic acid is required to be reacted with the active metal precursor, thus forming the active metal-carboxylate, and palmitic acid, myristic acid, oleic acid, or stearic acid may be used.

In the step 1-1, the active metal precursor and the carboxylic acid are mixed at a molar ratio of, for example, 1:1 to 1:3, to manufacture a mixed solution. When the molar ratio is out of the above range, there is a problem in that unreacted extra salts or acids may unintentionally participate in the subsequent processes.

The reduced pressure is preferably 100 to 0.001 torr, for example. When the reduced pressure is out of the above range, there is a problem in that the removal of impurities or additionally generated products is not smooth.

The step 1-2 is a step of increasing the temperature of the mixed solution after the step 1-1 to a first temperature and then primarily reacting the mixed solution. The range of the first temperature varies depending on the type of carboxylic acid that is used, but for example, the first temperature is preferably room temperature (25° C.) to 200° C. The pressure remains the same. Further, preferably, a temperature increase time is, for example, 10 minutes to 1 hour, and a reaction time is, for example, 10 minutes to 3 hours.

The step 1-3 is a step of increasing the temperature of the mixed solution after the step 1-2 to a second temperature higher than the first temperature, followed by a secondary reaction of the mixed solution. The second temperature may be, for example, in the range of 200 to 500° C., and is preferably a temperature higher than the first temperature. The pressure remains the same. Further, preferably, a temperature increase time is, for example, 10 minutes to 1 hour, and a reaction time is, for example, 10 minutes to 3 hours.

The step 1-4 is a step of injecting the mixed solution into the solvent in an inert atmosphere and then reducing the temperature to a third temperature (temperature reduction). The solvent is for adjusting the concentration of the mixed solution, both a coordinating solvent and a non-coordinating solvent are possible, and octadecene may be generally used. The third temperature range may be room temperature, and the pressure may be maintained at normal pressure. A temperature reduction time is preferably 20 minutes to 2 hours.

After the step 1-4, the active nanocluster solution having [Chemical Formula 1] of $T_xO_y(carboxylate)_z$ is manufactured. FIG. 1 is a mimetic view showing the generation of the active nanocluster of the present embodiment. According to this, it can be confirmed that the active metal-stearate in the solid state obtained by reacting the active metal precursor with the carboxylic acid is dissolved at 140° C. and then activated at 320° C. to form an active nanocluster.

In the present disclosure, it is possible to manufacture a quantum dot using an active nanocluster. The quantum dot includes a seed and a shell, the shell may be selectively included therein, and the seed is included by alloying the active metal derived from the active nanocluster described above.

In another aspect, in the present disclosure, the active nanocluster may be manufactured using the method of manufacturing the active nanocluster, and thereby the quantum dot may be manufactured.

Third Aspect of the Present Disclosure

A third aspect of the present disclosure is a Group III-V-based quantum dot synthesized using the active nanocluster according to the first aspect.

The quantum dot of the third aspect includes a seed and a shell. The shell may be selectively included therein, and the active metal derived from the active nanocluster described above is alloyed to be included in the seed.

As the active metal, at least one selected from the group consisting of Zn, Mn, Cu, Fe, Ni, Co, Cr, Ti, Zr, Nb, Mo, Ru, and a combination thereof, which has various oxidation numbers, may be used.

In the present disclosure, in the seed, the molar ratio of the Group III element and the active metal may be, for example, 1:3 to 1:30, preferably 1:3 to 1:20, more preferably 1:4 to 1:15, and even more preferably 1:5 to 1:10. When the concentration of the active metal is more than the above range, there is a problem in that the growth of the quantum dot is limited. When the concentration is less than the above range, there is a problem in that the growth is rapidly saturated and the stability of the crystal lattice is lowered, thus reducing the efficiency of the quantum dot.

The activated active metal precursor may be an active nanocluster including the active metal oxide-carboxylate of Chemical Formula 1 described in the first aspect of the present disclosure.

In the seed, materials of Al, Ga, In, and Ti, which are Group III elements, or a combination thereof and P, As, Sb, and Bi, which are Group V elements, or a combination thereof, for example, materials selected from the group consisting of a binary compound selected from the group consisting of GaN, GaP, GaAs, GaSb, AlN, Alp, AlAs, AlSb, InN, InP, InAs, InSb, and a mixtures thereof; a ternary compound selected from the group consisting of GaNP, GaNAs, GaNSb, GaPAs, GaPSb, AlNP, AlNAs, AlNSb, AlPAs, AlPSb, InNP, InNAs, InPSb, InPAs, InPSb, InGaP, and a mixture thereof; and a quaternary compound selected from the group consisting of GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a mixture thereof are alloyed with the active metal.

The active metal seems to play a role in stabilizing the crystal lattice and compensating for defects in the seed when the active metal is alloyed with Group III elements or a combination thereof and Group V elements or a combination thereof. The active metal is an active metal derived from the active nanocluster.

Further, the molar ratio of the Group III element and the Group V element in the seed may be, for example, 1:0.5 to 1:1.2, and preferably 1:0.7 to 1:1. When the molar ratio of the Group III element and the Group V element is more than the above range, there is a problem in that it is difficult to obtain a quantum dot in the desired wavelength band. When the molar ratio is less than the above range, there is a problem in that uniform growth is suppressed.

Furthermore, the seed may include an additional element. The additional element is included in the seed to change the properties of the quantum dot depending on the content thereof. When the seed includes the additional element, for example, an element such as Al, Ga, Ti, Mg, Na, Li, and Cu, there is an effect of preventing lattice mismatch to reduce surface defects, thereby increasing quantum efficiency.

The molar ratio of the Group III element and the additional element in the seed may be, for example, 1:0.2 to 1:0.8, and preferably 1:0.3 to 1:0.6. When the molar ratio of the Group III element and the additional element in the seed is more than or less than the above range, the lattice mismatch may not be effectively prevented, so there may be no change in quantum efficiency.

The shell is formed to surround the outer surface of the seed. The shell may be one selected from the group consisting of a Group II-VI semiconductor material, a Group III-V semiconductor material, and a Group IV-VI semiconductor material. The outer surface of the seed may be coated with the shell to prevent the occurrence of surface defects of the nanocrystals, thereby increasing the stability.

As the Group II element, one of the group consisting of Zn, Cd, Hg, Mg, or a combination thereof may be used. As the Group III element, one selected from the group consisting of Al, Ga, In, Ti, or a combination thereof may be used. As the Group IV element, one selected from the group consisting of Si, Ge, Sn, Pb, or a combination thereof may be used. As the Group VI element, one selected from the group consisting of O, S, Se, Te, or a combination thereof may be used.

In the present disclosure, it is preferable that a Group II-VI semiconductor be used as the shell. The molar ratio of the Group III element of the seed and the Group VI element of the precursor used for shell formation may be, for example, 1:3 to 1:20, preferably 1:5 to 1:15, and more preferably 1:8 to 1:10. When the molar ratio of the precursor used for the shell coating is more than or less than the above ratio, there is a problem in that a uniform shell coating is not achieved.

In this aspect, CdS, CdSe, CdTe, ZnS, ZnSe, ZnTe, ZnSeS, PbS, PbSe, PbSeS, PbTe, GaAs, GaP, InP, InGaP, InZnP, InAs, CuS, InN, GaN, InGaN, Alp, AlAs, InAs, GaAs, GaSb, InSb, AlSb, HgS, HgTe, HgCdTe, ZnCdS, ZnCdSe, CdSeTe, CuInSe2, CuInS2, AgInS2, and SnTe are capable of being used as the shell material.

In the Group III-V quantum dot of the active metal alloy, preferably, the average diameter of the quantum dot is, for example, 1.5 to 5 nm, and the thickness of the shell alone is, for example, 0.5 to 5 nm or 0.5 to 1 nm. When the average diameter and the thickness are out of the above range, the emission wavelength does not match, or the efficiency is reduced.

The quantum dot according to this aspect has an emission wavelength of, for example, 500 to 650 nm or 540 to 650 nm, and a full width at half maximum of, for example, 50 nm or less, 30 to 45 nm, or 34 to 45 nm.

Fourth Aspect of the Present Disclosure

A method of manufacturing a Group III-V quantum dot includes a precursor step, a seed forming step, a shell forming step, and a purification step. The name of each stage is a name given to distinguish each stage from other stages, and does not include all technical meanings of each stage.

The precursor step is a step of manufacturing the active nanocluster of Chemical Formula 1 as defined in the second aspect of the present disclosure. The active nanocluster is manufactured by performing thermal decomposition of the active metal-carboxylate. The constitution steps of the precursor step are the same as the step 1-1, the step 1-2, the step 1-3, and the step 1-4 described in the second aspect of the present disclosure, and a detailed description thereof will be omitted.

The seed forming step is a step of injecting Group III element precursor and Group V element precursor solutions into the precursor solution manufactured in the precursor step to thus form a seed in which an active metal, a Group III element, and a Group V element are alloyed. The seed forming step includes a step 2-1, a step 2-2, a step 2-2, and a step 2-4.

The step 2-1 is a step of mixing and agitating an active nanocluster solution, the Group III element precursor solution, and a solvent. The active nanocluster solution is as described above.

The Group III element precursor solution includes a Group III element precursor, a solvent, and a surfactant. As the Group III element precursor, all of the precursors containing the Group III element, such as halogen salts of the Group III element, may be used.

When the Group III element is indium, the indium precursor may be, for example, any one selected from the group consisting of indium(III) acetylacetonate, indium(III) chloride, indium(III) acetate, trimethyl indium, alkyl indium, aryl indium, indium(III) myristate, indium(III) myristate acetate, and indium(III) myristate 2 acetate, and may be preferably indium(III) acetylacetonate.

The solvent may be one or more selected from the group consisting of 2,6,10,15,19,23-hexamethyltetracoic acid (squalane), 1-octadecene (ODE), trioctylamine (TOA), tributylphosphine oxide, octadecene, octadecylamine, trioctylphosphine (TOP), and trioctylphosphine oxide (TOPO).

The surfactant may be selectively used, and may be a carboxylic acid-based compound, a phosphonic acid-based compound, or a mixture of these two compounds.

The carboxylic acid-based compound may be, for example, one or more selected from the group consisting of oleic acid, palmitic acid, stearic acid, linoleic acid, myristic acid, and lauric acid. The phosphonic acid-based compound may be, for example, one or more selected from the group consisting of hexylphosphonic acid, octadecylphosphonic acid, tetradecylphosphonic acid, hexadecylphosphonic acid, decylphosphonic acid, octylphosphonic acid, and butylphosphonic acid.

The step 2-2 is a step of increasing the temperature of the solution of the step 2-1 to a temperature of A for 5 to 20 minutes while reducing a pressure, followed by reaction for 50 to 100 minutes. The temperature of A is, for example, 100 to 150° C. When the temperature is lower than the above range, there is a possibility that the impurities in the precursor may not be removed, and when the temperature is higher than the above temperature range, the concentration of the solution is changed, which may interrupt the efficient growth of the quantum dot.

The step 2-3 is a step of increasing the temperature of the solution of the step 2-2 to a temperature of B for several seconds to 1 hour in an inert atmosphere and injecting a Group V element precursor solution. It is preferable that the temperature of B be higher than the temperature of A and range from 200 to 400° C. When the temperature is lower than the above temperature range, the formation of the quantum dot does not occur effectively, and when the temperature is higher than the above temperature range, there is a difficulty in controlling the emission wavelength.

The Group V element precursor solution includes a Group V element precursor and a solvent. As the Group V element precursor, for example, organometallic phosphorus such as tris(trimethylsilyl)phosphine (TMSP), aminophosphine, white phosphorus, tri(pyrazolyl)phosphane, and calcium phosphide may be used.

An alkylphosphine-based surfactant may be added to the Group V element precursor solution, so the Group V element and the alkylphosphine-based surfactant are bonded to form a new organic composite, which enables a more stable reaction to secure higher suitability for mass production. The size of the quantum dot may be adjusted depending on the type of the alkylphosphine-based surfactant. The alkylphosphine-based surfactant may be one or more selected from the group consisting of triethyl phosphine, tributyl phosphine, trioctyl phosphine, triphenyl phosphine, and tricyclohexyl phosphine, but is not limited thereto.

As the solvent of the Group V element precursor solution, for example, trioctylphosphine (TOP), tributylphosphine (TBP), octadecene (ODE), and amines (primary amine, secondary amine, and third amine) may be used. Preferably, the molar concentration of the Group V element precursor solution is, for example, 0.001 to 2M.

Preferably, the molar ratio of the active metal and the Group V element is, for example, 1:0.02 to 1:0.006 or 1:0.03 to 1:0.005. When the molar ratio is out of the above range, a problem in which non-uniform quantum dots are formed may occur.

The shell forming step is a step of forming a shell on the surface of the seed after the seed forming step. The shell forming step includes a step 4-1, a step 4-2, and a step 4-3.

In the step 4-1, the shell is formed by injecting one or both of the Group III element precursor solution and the Group V element precursor solution, or by injecting one or both of the Group II element precursor solution and the Group VI element precursor solution. That is, the shell is formed by injecting a Group II element precursor or/and a Group VI element precursor or a Group III element precursor or/and a Group V element precursor.

It is preferable that the shell include a Group II-VI semiconductor.

The molar ratio of the Group III element of the seed and the Group VI element of the precursor used for shell formation may be, for example, 1:3 to 1:20, preferably 1:5 to 1:15, and more preferably 1:8 to 1:10. When the molar ratio of the precursor used for the shell coating is more than or less than the above ratio, there is a problem in that a uniform shell coating is not achieved.

Meanwhile, in the case of forming the shell using the Group II element and the Group VI element, unreacted Group II elements remain after the Group II elements are involved in active nanocluster formation, so the Group II elements are capable of being included without separate injection.

The step 4-2 is a step in which the solution in the step 4-1 is heated to X° C. for 10 to 30 minutes and then reacted for 2 to 4 hours. The range of the temperature of X is preferably 200 to 400° C. When the temperature is out of the above temperature range, there is a problem in that an effective shell coating is not performed.

The step 4-3 is a step of cooling the solution in the step 4-1 to room temperature while blowing with an inert gas. When the blowing with an inert gas is not performed, there is a problem in that the surface of the quantum dot is oxidized due to the injection of air at high temperatures.

The purification step includes a step 5-1, a step 5-2, and a step 5-3.

The step 5-1 is a step in which the solution after the shell forming step is placed in a centrifugable container, and for example, an alcohol solvent and a polar solvent (for example, 2-propanol) are added thereto and then centrifuged to discard a supernatant, thereby obtaining a precipitate.

Further, preferably, the number of rotations during centrifugation is, for example, 1000 to 20000 rpm.

The step 5-2 is a step of dissolving the precipitate in an organic solvent such as hexane, toluene, octadecane, and heptane.

The step 5-3 is a step of repeating the step 5-1 and the step 5-2 at least once and then storing the resultant material in a dissolved state in a non-polar solvent.

Fifth Aspect of the Present Disclosure

A fifth aspect of the present disclosure is a Group III-V-based quantum dot synthesized using the active nanocluster according to the first aspect.

The quantum dot of the fifth aspect is a Group III-V-based quantum dot including a bandgap control layer that includes a seed including a Group III element and a Group V element and a growth layer including a Group III element and a Group V element formed on the outer surface of the seed. An active metal having various oxidation numbers is included in at least one of the seed and the growth layer constituting the bandgap control layer.

The term "bandgap control layer" used in the present disclosure refers to a layer that has a seed and a growth layer and provides the improved full width at half maximum and luminous efficiency by controlling the bandgap.

The growth layer is a semiconductor layer grown on the outer surface of the seed. The growth layer is a Group III-V semiconductor layer including Group III elements or a combination thereof and Group V elements or a combination thereof, and may include the same kind of semiconductor material as the Group III element and the Group V element included in the seed. The growth layer may also include an active metal. Further, the active metal should be included in at least one of the seed and the growth layer.

The activated active metal precursor may be an active nanocluster including the active metal oxide-carboxylate of Chemical Formula 1 described in the first aspect of the present disclosure.

The description of the seed overlapping with the seed disclosed in the third aspect of the present disclosure will be omitted. The seed may further include an additional element. The additional element is included in the seed to change the properties of the quantum dot depending on the content thereof. When the seed includes an additional element, for example, an element such as Al, Ga, Ti, Mg, Na, Li, or Cu, there is an effect of preventing lattice mismatch to reduce surface defects, thereby increasing quantum efficiency.

The molar ratio of the Group III element and the additional element in the seed may be, for example, 1:0.2 to 1:0.8, and preferably 1:0.3 to 1:0.6. When the molar ratio of the Group III element and the additional element in the seed is more than or less than the above range, the lattice mismatch may not be effectively prevented, so there may be no change in quantum efficiency.

The growth layer is a semiconductor layer grown on the outer surface of the seed. The growth layer is a Group III-V semiconductor layer including Group III elements or a combination thereof and Group V elements or a combination thereof, may include the same kind of semiconductor material as the Group III element and the Group V element included in the seed, and may also include an active metal. The active metal may include the same kind of material as the active metal included in the seed.

The active metal plays a role in stabilizing the crystal lattice and compensating for defects in the seed when the active metal is alloyed with Group III elements or a combination thereof and Group V elements or a combination thereof.

The molar ratio of the Group III element of the bandgap control layer and the active metal of the bandgap control layer may be, for example, 1:0.2 to 1:2, preferably 1:0.2 to 1:1, and more preferably 1:0.5 to 1:1. When the concentration of the active metal is more than the above range, the growth of the growth layer is suppressed, so it is difficult to adjust the wavelength of the nanocrystal. When the concentration of the active metal is less than the above range, the luminous efficiency may be reduced.

Further, the molar ratio of the Group III element of the bandgap control layer and the Group V element of the bandgap control layer may be, for example, 1:0.5 to 1:2, preferably 1:0.5 to 1:1, and more preferably 1:0.6 to 1:1. When the concentration of the Group V element of the bandgap control layer is more than the above range, there is a problem in that the stability of the synthesized quantum dot is reduced, and when the concentration of the Group V element of the bandgap control layer is less than the above range, there may be difficulties in growth because a Group V precursor is not injected in a sufficient amount.

The thickness of the growth layer included in the bandgap control layer may be, for example, 0.5 to 2.5 nm and preferably 1 to 2 nm. When the thickness is more than the above range, there is a problem of red shifting from the desired wavelength band. When the thickness is less than the above range, there is a problem in that the stability of quantum dot is reduced.

When the active metal is included in the growth layer included in the bandgap control layer, the molar ratio of the Group III element and the active metal in the bandgap control layer may be, for example, 1:0.2 to 1:2, preferably 1:0.2 to 1:1, and more preferably 1:0.3 to 1:0.8. When the concentration of the active metal is more than the above range, the growth of the growth layer is suppressed, making it difficult to adjust the wavelength of the nanocrystals, and when the concentration of the active metal is less than the above range, luminous efficiency may be reduced.

The growth layer included in the bandgap control layer may further include an additional element. The additional element is included in the growth layer to change the properties of quantum dot depending on the content thereof. When the growth layer includes an additional element other than the active metal, for example, an element such as Al, Ga, Ti, Mg, Na, Li, or Cu, the growth of the growth layer may be promoted and the emission wavelength may be changed.

Accordingly, in an embodiment, with respect to the molar ratio of individual elements in the seed, for example, the molar ratio of In, Zn, and P may be 1:8:0.7. With respect to the molar ratio of individual elements in the bandgap control layer, for example, the molar ratio of In, Zn, and P may be 1:0.7:0.9.

The shell is formed to surround the outer surface of the seed and the growth layer, that is, the bandgap control layer. The shell is as described in the second aspect of the present disclosure.

The quantum dot according to this aspect has an emission wavelength of, for example, 500 to 650 nm or 540 to 650 nm, and a full width at half maximum of, for example, 50 nm or less, 30 to 45 nm, or 34 to 45 nm.

<Sixth Aspect of the Present Disclosure>

A method of manufacturing a Group III-V quantum dot of an active metal alloy includes a precursor step, a seed forming step, a growth layer forming step, a shell forming step, and a purification step. The seed forming step and the growth layer forming step may be collectively referred to as a bandgap control layer forming step. The name of each stage is a name given to distinguish each stage from other stages, and does not include all technical meanings of each stage. In particular, the precursor stage is interpreted as a concept separate from the active metal precursor.

The precursor step may be a step of manufacturing the active nanocluster of Chemical Formula 1 defined in the second aspect of the present disclosure. The constitution steps of the precursor step are the same as a step 1-1, a step 1-2, a step 1-3, and a step 1-4 described in the second aspect of the present disclosure, and a detailed description thereof will be omitted.

The seed forming step is a step of forming the seed in which the active metal, the Group III element, and the Group V element are alloyed by injecting the Group III element precursor and Group V element precursor solutions into the precursor solution manufactured in the precursor step. The constitution steps of the seed forming step may be the same as a step 2-1, a step 2-2, a step 2-2, and a step 2-4, and a detailed description thereof will be omitted.

The growth layer forming step is a step of forming the growth layer on the outer surface of the seed after the seed forming step. The growth layer is a semiconductor layer grown on the outer surface of the seed. The growth layer is a Group III-V semiconductor layer including Group III elements or a combination thereof and Group V elements or a combination thereof, may include the same kind of semiconductor material as the Group III element and the Group V element included in the seed, and also includes an active metal. The active metal may include the same kind of material as the active metal included in the seed.

The growth layer is formed by injecting a Group III element-active metal-Group V element (hereinafter, referred to as 3-M-5) composite solution to be described later into the solution of the seed forming step.

In the 3-M-5 composite solution, preferably, the molar ratio of the Group III element and the active metal is, for example, 1:0.2 to 1:0.8 and the molar ratio of the active metal and the Group V element is, for example, 1:1 to 1:1.5. In the case of a molar ratio out of the above range, there is a problem in that the growth of the growth layer does not occur evenly, thus synthesizing non-uniform quantum dots.

The 3-M-5 composite solution is injected into the solution at a temperature of B after the seed forming step to react, and the temperature is reduced to a temperature of C in an inert atmosphere. Preferably, the range of the temperature of C is, for example, 130 to 170° C. The reason for reducing the temperature to the temperature of C is to inject the shell precursor, and when the temperature is higher than the above temperature range, a uniform shell coating is not achieved, so there is a problem in that the full width at half maximum is widened.

Meanwhile, the 3-M-5 composite solution is a solution in which a Group III element, an active metal, and a Group V element are mixed. A method of manufacturing the 3-M-5 composite solution includes a step 3-1, a step 3-2, a step 3-3, a step 3-4, and a step 3-5.

The step 3-1 is a step of injecting and agitating a Group III element precursor, an active metal precursor, and a solvent.

As the Group III element precursor, all precursors containing the Group III element such as halogen salts of the Group III element may be used. When the Group III element is indium, the indium precursor may be, for example, any one selected from the group consisting of indium(III) acetylacetonate, indium(III) chloride, indium(III) acetate, trimethyl indium, alkyl indium, aryl indium, indium(III) myristate, indium(III) myristate acetate, and indium(III) myristate 2 acetate, and may be preferably indium(III) acetylacetonate.

As the active metal precursor, a compound containing an active metal may be used without limitation, and at least one or more metals selected from the group consisting of Zn, Mn, Cu, Fe, Ni, Co, Cr, Ti, Zr, Nb, Mo, and Ru may be used as the active metal. For example, when the active metal is Zn, zinc acetate (Zn acetate) or Zn (acac) (Zn (acetylacetonate)) may be used. When an acac-based precursor is used rather than zinc acetate (Zn acetate), there is a merit in that In—Zn carboxylate is easily synthesized.

The solvent of the step 3-1 may be, for example, one or more selected from the group consisting of 2,6,10,15,19,23-hexamethyltetracoic acid (squalane), 1-octadecene (ODE), trioctylamine (TOA), tributylphosphine oxide, octadecene, octadecylamine, trioctylphosphine (TOP), and trioctylphosphine oxide (TOPO).

The step 3-2 is a step of increasing the temperature of the solution of the step 3-1 to a temperature of a for 5 to 20 minutes while reducing the pressure, followed by reaction for 50 to 100 minutes. The temperature of a may be, for example, 100 to 150° C., and preferably 110 to 130° C. The reason for increasing the temperature and reducing the pressure in this step is to remove a small amount of impurities remaining in the precursor and also synthesize In—Zn carboxylate. When the temperature is higher than the above temperature range, the amount of the solvent may be changed to change the concentration thereof. When the temperature is lower than the above temperature range, impurities may not be properly removed.

The step 3-3 is a step of replacing the solution of the step 3-2 with an inert atmosphere and then increasing the temperature to a temperature of β. In consideration of the reactivity of the Group V precursor to be added later, the temperature of β is preferably around 250 to 300° C. for instant seed generation.

The step 3-4 is a step of injecting the Group V element precursor solution into the solution of the step 3-3 to perform a reaction at room temperature (25° C.) for 10 to 100 minutes. This room temperature condition is to prevent In—Zn—P from forming particles due to the high reactivity of the Group V element precursor.

The Group V element precursor solution of the step 3-3 includes a Group V element precursor and a solvent. As the Group V element precursor, for example, organometallic phosphorus such as tris(trimethylsilyl)phosphine (TMSP), aminophosphine, white phosphorus, tri(pyrazolyl)phosphane, and calcium phosphide may be used.

An alkylphosphine-based surfactant may be added to the Group V element precursor solution. In the case of use in combination, the Group V element and the alkylphosphine-based surfactant are bonded to form a new organic composite, which enables a more stable reaction to secure higher suitability for mass production. The size of the quantum dot may be adjusted depending on the type of the alkylphosphine-based surfactant.

An alkylphosphine-based surfactant may be added to the Group V element precursor solution. In the case of use in combination, the Group V element and the alkylphosphine-based surfactant are bonded to form a new organic composite, which enables a more stable reaction to secure higher suitability for mass production. The size of the quantum dot may be adjusted depending on the type of the alkylphosphine-based surfactant.

The alkyl phosphine-based surfactant may be one or more selected from the group consisting of triethyl phosphine, tributyl phosphine, trioctyl phosphine, triphenyl phosphine, and tricyclohexyl phosphine, but is not limited thereto.

Further, as the solvent of the Group V element precursor solution, for example, TOP, TBP, ODE, and amines (primary amine, secondary amine, and third amine) may be used. The molar concentration of the Group V element precursor solution is preferably 0.001 to 2M.

It is preferable that the molar ratio of the Group III element and the active metal be 1:0.2 to 1:0.8. Preferably, the molar ratio may be 1:0.3 to 1:0.6. When the molar ratio of the Group III element and the active metal does not satisfy the above range, the lattice mismatch may not be effectively prevented, so there may be no change in quantum efficiency.

Preferably, the molar ratio of the active metal and the Group V element is, for example, 1:1 to 1:1.5. In the case of a molar ratio out of the above range, there may be a problem in that the growth of the growth layer does not occur evenly, so non-uniform quantum dots are synthesized.

The additional element included in the growth layer may be separately included or the unreacted additional element may be included as the additional element included during the formation of the seed. For example, when it is desired to inject the additional element into the growth layer, there may be 1) a method of adding a precursor including an additional element before injection into a growth layer, or 2) a method of adding an additional element together with a Group V element when forming a seed. An example of the latter may include a method of mixing a TOP-TMSP solution with a GaCl3-toluene solution and forming a seed.

The shell forming step is a step of forming a shell on the surface of the growth layer after the growth layer forming step. The shell forming step includes a step 4-1, a step 4-2, and a step 4-3. The constitution steps of the shell forming step may be the same as the step 4-1, the step 4-2, and the step 4-3 described in the fourth aspect of the present disclosure, and a detailed description thereof will be omitted.

The purification step includes a step 5-1, a step 5-2, and a step 5-3. The constitution steps of the purification step may be the same as the step 5-1, the step 5-2, and the step 5-3 described in the fourth aspect of the present disclosure, and a detailed description thereof will be omitted.

Hereinafter, Examples of the present disclosure will be described in more detail. The following Examples are provided to illustrate the present disclosure, and are not intended to limit the present disclosure thereto.

EXAMPLE

Example 1: Manufacturing of Zn-OXO

Manufacturing of Active Nanocluster Solution

1. Zinc acetate (Zn acetate) and oleic acid were placed in a 250 ml three neck flask and heated to 120° C. at a pressure reduced at room temperature, followed by filling with an inert gas after 1 hour, thus generating a $Zn(oleate)_2$ solution.

2. The generated Zn(oleate)$_2$ solution was heated to a high temperature to manufacture an active nanocluster.

3. Then, octadecene was injected, the temperature was reduced to room temperature, and the concentration of the mixed solution was 0.5M.

Example 2: Manufacturing of Cu-OXO

Manufacturing of Active Nanocluster Solution

1. Copper acetate (Cu(II) acetate) and oleic acid were placed in a 250 ml three neck flask and heated to 120° C. at a pressure reduced at room temperature, followed by filling with an inert gas after 1 hour, thus generating a Cu(oleate)$_2$ solution.

2. The generated Cu(oleate)$_2$ solution was heated to a high temperature to manufacture an active nanocluster.

3. Then, octadecene was injected, the temperature was reduced to room temperature, and the concentration of the mixed solution was 0.5M.

Example 3: Manufacturing of InZnP Composite Solution Used for Growth Layer

1. Indium acetate (In acetate), zinc acetate (Zn acetate), oleic acid, and octadecene were injected into a three neck flask and agitated.

2. The temperature of the solution was increased to 120° C. while the pressure was reduced to perform a reaction.

3. After the solution was replaced with an inert gas, the temperature was reduced.

4. Tris(trimethylsilyl)phosphine (TMSP) was injected into the solution, and the manufactured solution is called an In—Zn—P composite solution.

Example 4: InZnP@ZnSeS Quantum Dot Using Zn-OXO

An InZnP@ZnSeS quantum dot was manufactured as follows using the Zn-OXO active nanocluster solution synthesized in Example 1.

1. Octadecene (ODE), an active nanocluster, and an In precursor were placed in a three neck flask and agitated. The concentration of each precursor was 0.1 mmol for In and 2 mmol for Zn.

2. The solution was reacted under reduced pressure at 120° C. for 1 hour.

3. Tris(trimethylsilyl)phosphine (TMSP) was injected into the solution filled with an inert gas at 280° C. The molar ratio of In and P was 1:0.7.

4. After the solution was reacted at 280° C. for 1 hour, the temperature was reduced to manufacture an InZnP seed.

5. A TOP-Se solution in which selenium was dissolved in trioctylphosphine and a TOP-S solution in which sulfur was dissolved in trioctylphosphine as shell materials were injected into the InZnP seed to be reacted.

6. The obtained quantum dot was placed in acetone or ethanol and centrifuged.

7. After the centrifugation, the precipitate was dispersed in hexane (1-hexane) to obtain a quantum dot solution.

Example 5: InZnP/InZnP Growth@ZnSeS Quantum Dot Using Zn-OXO

An InZnP/InZnP growth@ZnSeS quantum dot was manufactured as follows using the Zn-OXO active nanocluster solution synthesized in Example 1.

1. Octadecene (ODE), an active nanocluster, and an In precursor were placed in a three neck flask and agitated. The concentration of each precursor was 0.1 mmol for In and 2 mmol for Zn.

2. The solution was reacted under reduced pressure at 120° C. for 1 hour.

3. Tris(trimethylsilyl)phosphine (TMSP) was injected into the solution filled with an inert gas at 280° C. The molar ratio of In and P was 1:0.7.

4. After the solution was reacted at 280° C. for 1 hour, the temperature was reduced to manufacture an InZnP seed.

5. 5 mL of the In—Zn—P composite solution manufactured was injected into the InZnP seed (Preparation Example 4).

6. After the injection and then substitution with an inert gas, a quantum dot having an InZnP growth layer included in a bandgap control layer on an InZnP seed included in the bandgap control layer was manufactured.

7. A TOP-Se solution in which selenium was dissolved in trioctylphosphine and a TOP-S solution in which sulfur was dissolved in trioctylphosphine as shell materials were injected into the manufactured InZnP/InZnP quantum dot solution to be reacted.

8. The obtained quantum dot was placed in acetone or ethanol and centrifuged.

9. After the centrifugation, the precipitate was dispersed in hexane (1-hexane) to obtain a quantum dot solution.

Example 6: InZnGaP@ZnSeS Quantum Dot Using Zn-OXO

An InZnGaP@ZnSeS quantum dot was manufactured as follows using the Zn-OXO active nanocluster solution synthesized in Example 1.

1. Octadecene (ODE), an active nanocluster solution, and an In precursor were placed in a three neck flask and agitated. The concentration of each precursor was 0.1 mmol for In and 2 mmol for Zn.

2. The solution was reacted under reduced pressure at 120° C. for 1 hour.

3. Tris(trimethylsilyl)phosphine (TMSP) and gallium chloride were injected into the solution filled with an inert gas at 280° C. The molar ratio of In, P, and Ga was 1:0.7:0.5.

4. After the solution was reacted at 280° C. for 1 hour, the temperature was reduced to manufacture an InZnGaP seed.

5. A TOP-Se solution in which selenium was dissolved in trioctylphosphine and a TOP-S solution in which sulfur was dissolved in trioctylphosphine as shell materials were injected into the InZnP seed to be reacted.

6. The obtained quantum dot was placed in acetone or ethanol and centrifuged.

7. After the centrifugation, the precipitate was dispersed in hexane (1-hexane) to obtain a quantum dot solution.

Example 7: InZnGaP/InZnP Growth@ZnSeS Quantum Dot Using Zn-OXO

An InZnGaP/InZnP growth@ZnSeS quantum dot was manufactured as follows using the Zn-OXO active nanocluster solution synthesized in Example 1.

1. Octadecene (ODE), an active nanocluster, and an In precursor were placed in a three neck flask and agitated. The concentration of each precursor was 0.1 mmol for In and 2 mmol for Zn.

2. The solution was reacted under reduced pressure at 120° C. for 1 hour.

3. Tris(trimethylsilyl)phosphine (TMSP) and gallium chloride were injected into the solution filled with an inert gas at 280° C. The molar ratio of In, P, and Ga was 1:0.7:0.5.

4. After the solution was reacted at 280° C. for 1 hour, the temperature was reduced to manufacture an InZnGaP seed included in a bandgap control layer.

5. 5 mL of the In—Zn—P composite solution manufactured was injected into the InZnP seed (Preparation Example 4).

6. After the injection and then substitution with an inert gas, a quantum dot having an InZnP growth layer included in the bandgap control layer on an InZnGaP seed included in the bandgap control layer was manufactured.

7. A TOP-Se solution in which selenium was dissolved in trioctylphosphine and a TOP-S solution in which sulfur was dissolved in trioctylphosphine as shell materials were injected into the manufactured InZnGaP/InZnP quantum dot solution to be reacted.

8. The obtained quantum dot was placed in acetone or ethanol and centrifuged.

9. After the centrifugation, the precipitate was dispersed in hexane (1-hexane) to obtain a quantum dot solution.

Example 8: InZnP@ZnSeS Quantum Dot Using Zn-OXO

An InZnP@ZnSeS quantum dot was manufactured in the same manner as in Example 4 using the active nanocluster solution synthesized in Example 1. The manufacturing procedure was the same as Example 1, except that the concentration of each precursor was 0.1 mmol for In and 0.25 mmol for Zn.

Example 9: InZnP@ZnSeS Quantum Dot Using Zn-OXO

An InZnP@ZnSeS quantum dot was manufactured in the same manner as in Example 4 using the active nanocluster solution synthesized in Example 1. The manufacturing procedure was the same as Example 1, except that the concentration of each precursor was 0.1 mmol for In and 6.25 mmol for Zn.

Example 10: InZnP/InZnP Growth@ZnSeS Quantum Dot Using Zn-OXO

A quantum dot including a bandgap control layer was manufactured in the same manner as in Example 5, except that an In—P composite solution, to which Zn acetate was not added unlike the In—Zn—P composite solution of Example 3, was manufactured to use.

Example 11: InZnP/InZnP Growth@ZnSeS Quantum Dot Using Zn-OXO

A quantum dot including a bandgap control layer was manufactured in the same manner as in Example 5, except that an In—Zn—P composite solution was manufactured by adding Zn acetate in a concentration of 2.5 mmol instead of 0.5 mmol to the In—Zn—P composite solution of Example 3 and then used.

COMPARATIVE EXAMPLE

Comparative Example 1: Manufacturing of Zn(oleate)2

1. Zinc acetate (Zn acetate) and oleic acid were placed in a 250 ml three neck flask and heated to 120° C. at a pressure reduced at room temperature, followed by filling with an inert gas after 1 hour, thus generating a Zn(oleate)$_2$ solution.

Comparative Example 2: InZnP@ZnSeS Quantum Dot Using Zn Oleate

A quantum dot was manufactured using the same process as Example 4, except that the active nanocluster solution of <Zn-OXO> in Example 4 was replaced with the zinc oleate (Zn oleate) solution synthesized in Comparative Example 1.

Comparative Example 3: InZnP/InZnP Growth@ZnSeS Quantum Dot Using Zn-Oleate

A quantum dot was manufactured using the same process as Example 5, except that the active nanocluster solution of <Zn-OXO> in Example 5 was replaced with the zinc oleate (Zn oleate) solution synthesized in Comparative Example 1.

Comparative Example 4: InZnGaP@ZnSeS Quantum Dot Using Zn-Oleate

A quantum dot was manufactured using the same process as Example 6, except that the active nanocluster solution of <Zn-OXO> in Example 6 was replaced with the zinc oleate (Zn oleate) solution synthesized in Comparative Example 1.

Comparative Example 5: InZnGaP/InZnP Growth@ZnSeS Quantum Dot Using Zn Oleate

A quantum dot was manufactured using the same process as Example 7, except that the active nanocluster solution of <Zn-OXO> in Example 7 was replaced with the zinc oleate (Zn oleate) solution synthesized in Comparative Example 1.

EXPERIMENTAL EXAMPLE

Experimental Example 1

In order to confirm the active nanocluster according to the activation of the active metal, MALDI-TOP data for the active nanocluster solution manufactured in Example 1 was obtained and are shown in FIG. 2.

FIG. 2 specifically shows the change in weight according to the activation of an active metal precursor (Zn(oleate)$_2$). When the activation is performed, peaks are formed at not only 975 m/z appearing even in a conventional black graph, but also at 1683 m/z and 3020 m/z as in a red graph. As a result of analysis of the peaks at 1683 m/z and 3020 m/z, it could be seen that the peaks were consistent with $Zn_4O$ (carboxylate)$_6$ and $Zn_7O_2$(carboxylate)$_{10}$. From this, it could be confirmed that the active nanocluster was synthesized by activating the active metal precursor.

Further, from the result of checking the ratio of active metal-carboxylate and the active metal oxide-carboxylate using the value obtained by integrating the peaks, it could be seen that the active metal oxide-carboxylate is included at a weight ratio of approximately 20:80.

Experimental Example 2

Figure 3:
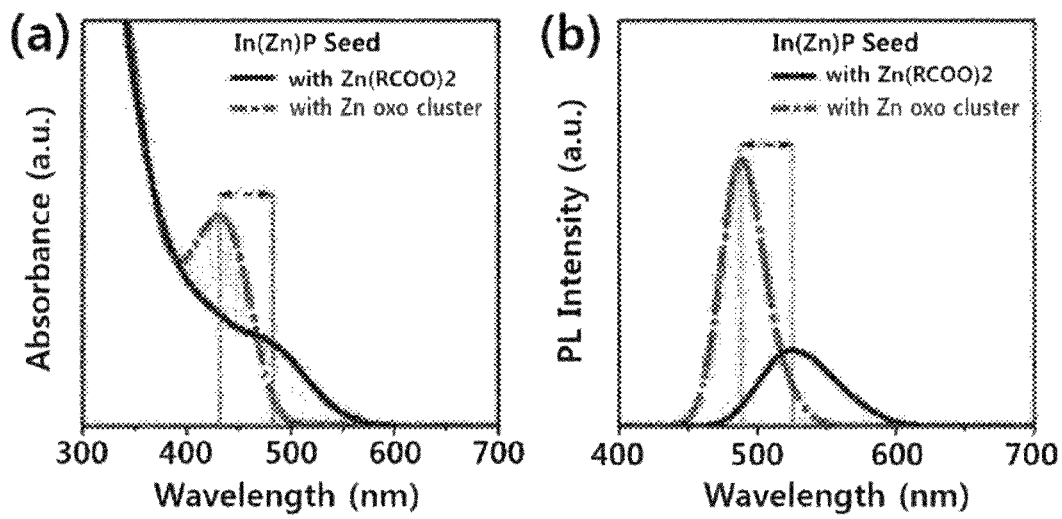
FIG. 3 is a graph showing the UV and PL spectra measured for the seed of the quantum dot of Example 4 and the seed of the quantum dot of Comparative Example 2 in the present disclosure.
Figure 4:
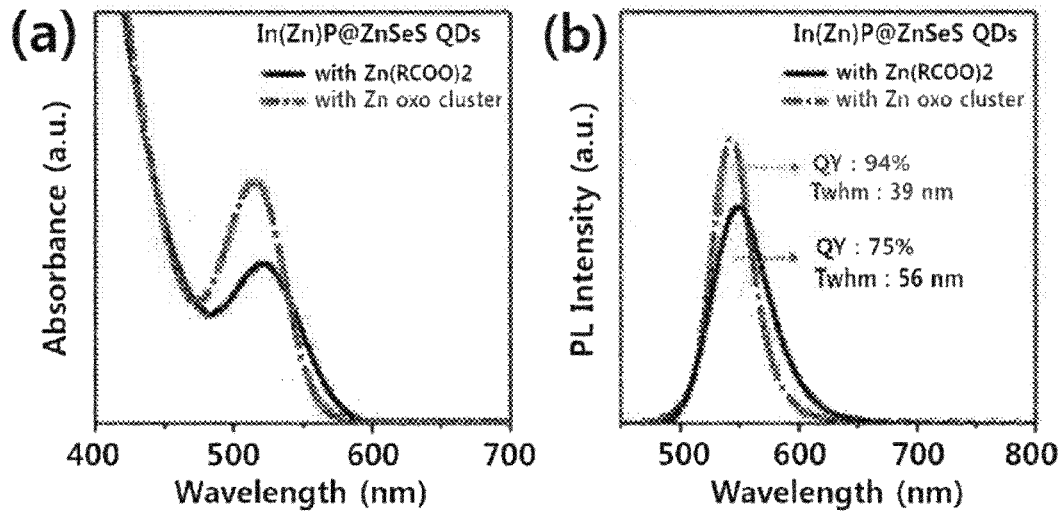
FIG. 4 is a graph showing the measurement of the UV and PL spectra of the quantum dot of Example 4 and the quantum dot of Comparative Example 2 manufactured in the present disclosure.

The quantum dot of Example 4 and the quantum dot of Comparative Example 2 were manufactured to measure UV and PL spectra, and the measured UV and PL spectra are shown in FIG. 4. Further, the UV and PL spectra of the seed of the quantum dot of Example 4 and the seed of the quantum dot of Comparative Example 2 in the present disclosure were measured and are shown in FIG. 3. Further, FIG. 4 is a graph showing the measurement of UV and PL spectra of the quantum dot of Example 4 and the quantum dot of Comparative Example 2 manufactured in the present disclosure.

According to FIGS. 3 and 4, in the case of Example 4, it could be confirmed that quantum dots having smaller and more uniform sizes and high quantum efficiency are obtained due to the use of the active nanocluster compared to Comparative Example 2.

Experimental Example 3

Figure 5:
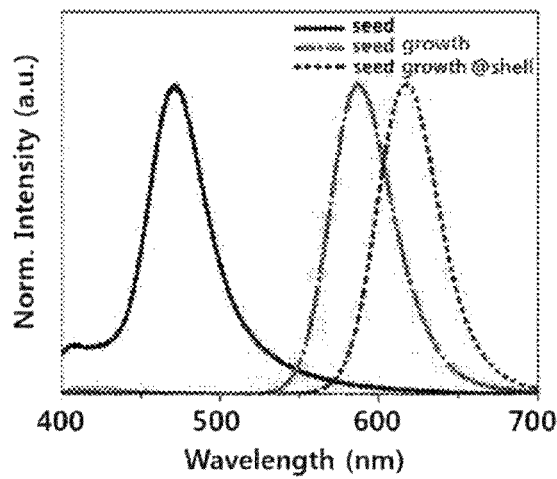
FIG. 5 is a graph showing the measurement of the PL spectrum of the quantum dot of Example 5 and the quantum dot of Comparative Example 3 manufactured in the present disclosure.

The quantum dot of Example 5 and the quantum dot of Comparative Example 3 were manufactured to measure UV and PL spectra, and the measured UV and PL spectra are shown in FIG. 5. Further, FIG. 6 is a graph showing the PL spectrum measured for each of steps of forming a seed, a growth layer, and a shell of the quantum dot of Example 5 of the present disclosure.

According to FIG. 5, in the case of Example 5, it could be confirmed that quantum dots having smaller and more uniform sizes and including a bandgap control layer having the improved full width at half maximum are manufactured due to the use of the active nanocluster compared to Comparative Example 3.

Figure 6:
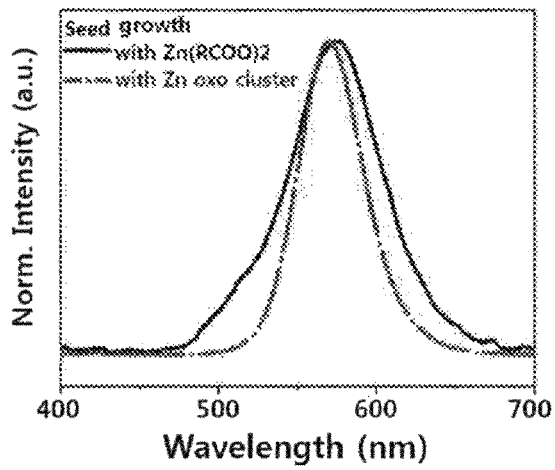
FIG. 6 is a graph showing the PL spectrum measured for each of steps of forming a seed, a growth layer, and a shell of the quantum dot of Example 5 of the present disclosure.

Further, as shown in FIG. 6, a right-shifted emission maximum change was confirmed.

Experimental Example 4

The quantum dots obtained in Examples 4 to 7 and the quantum dots obtained in Comparative Examples 2 to 5 were each dissolved in toluene. The analyzed photoluminescence data [emission wavelength peak (emission peak), quantum efficiency (quantum yield), full width at half maximum (FWHM)] was confirmed by radiating light with a wavelength of 450 nm using Otsuka Electronics QE-2000. The measurement results are shown in Table 1 and FIGS. 4 to 6.

TABLE 1

| Classification | Emission peak (nm) | FWHM (nm) | Q.Y. (%) |
| --- | --- | --- | --- |
| Example 4 | 530 | 39 | 94 |
| Example 5 | 621 | 45 | 84 |
| Example 6 | 535 | 38 | 96 |
| Example 7 | 625 | 44 | 88 |
| Comparative Example 2 | 535 | 56 | 75 |
| Comparative Example 3 | 622 | 60 | 72 |
| Comparative Example 4 | 541 | 56 | 80 |
| Comparative Example 5 | 627 | 57 | 80 |

As can be seen from the results in Table 1, the quantum dots of Examples 4 to 7 using the active nanocluster had a narrow full width at half maximum and showed excellent luminous efficiency compared to the quantum dots of Comparative Examples 2 to 5 using zinc oleate instead of the active nanocluster. Specifically, in the case of the quantum dot of Example 4 using the active nanocluster but including no additional element, the full width at half maximum was significantly improved and the luminous efficiency was increased compared to the quantum dot of Comparative Example 2 including no additional element and using zinc oleate instead of the active nanocluster. That is, it was confirmed that the full width at half maximum was significantly improved and the luminous efficiency was increased when the active nanocluster was used.

Further, both the quantum dot of Example 4 and the quantum dot of Comparative Example 2 showed the emission maximum of the emission spectrum of 500 to 550 nm. In the case of Example 4 of both, it was confirmed that the quantum dot shows the right-shifted emission maximum and it can be seen that the full width at half maximum and the luminous efficiency are improved compared to the quantum dot of Comparative Example 2.

Further, the quantum dot of Example 6 including the additional element and using the active nanocluster according to the present disclosure had a narrow full width at half maximum and showed excellent luminous efficiency compared to the quantum dot of Comparative Example 4 including the additional element and using zinc oleate instead of the active nanocluster.

For reference, in the case of the quantum dot of Comparative Example 4 including the additional element and using zinc oleate instead of the active nanocluster, it was confirmed that only the luminous efficiency was slightly increased compared to the quantum dot of Comparative Example 2 including no additional element and using zinc oleate instead of the active nanocluster.

Further, from the comparison of the quantum dot of Example 7 and the quantum dot of Example 4 of the present disclosure each using the active nanocluster, it can be confirmed that there is a difference that Example 7 includes the additional element. From the measurement results, it can be confirmed that the luminous efficiency is slightly improved.

Further, from the comparison of the quantum dot of Example 5 and the quantum dot of Example 7 of the present disclosure each including the growth layer, it can be confirmed that there is a difference that Example 7 includes the additional element. From the measurement results, it can be confirmed that the luminous efficiency is slightly improved.

As a result, in the case of the quantum dots of Examples 4 to 7 according to the present disclosure, it can be seen that the quantum dots showed the significantly superior results in terms of full width at half maximum and luminous efficiency compared to the quantum dots of Comparative Examples 2 to 5.

Experimental Example 5

The quantum dots of Example 8 and Example 9 manufactured while changing the contents of the Group III element and active metal in the seed were each dissolved in toluene. The analyzed photoluminescence data [emission wavelength peak (emission peak), quantum efficiency (quantum yield), full width at half maximum (FWHM)] was confirmed by radiating light with a wavelength of 450 nm using Otsuka Electronics QE-2000. The measurement results are shown in Table 2.

TABLE 2

| Classification | Content ratio of In and Zn in seed | Emission peak (nm) | FWHM (nm) | Q.Y. (%) |
| --- | --- | --- | --- | --- |
| Example 4 | 1:8 | 530 | 39 | 94 |
| Example 8 | 1:1 | 545 | 45 | 20 |
| Example 9 | 1:25 | 527 | 43 | 80 |

As can be seen from the results in Table 2, from the comparison of the quantum dot of Example 4 with the quantum dots of Examples 8 and 9, it could be confirmed that differences occur in the full width at half maximum and the luminous efficiency due to the differences in the content ratio of the Group III element and the active metal constituting the seed.

Experimental Example 6

The quantum dots of Example 10 and Example 11 manufactured while changing the contents of the Group III element and active metal in the bandgap control layer were each dissolved in toluene. The analyzed photoluminescence data [emission wavelength peak (emission peak), quantum efficiency (quantum yield), full width at half maximum (FWHM)] was confirmed by radiating light with a wavelength of 450 nm using Otsuka Electronics QE-2000. The measurement results are shown in Table 3.

TABLE 3

| Classification | Content ratio of In and Zn in bandgap control layer | Emission peak (nm) | FWHM (nm) | Q.Y. (%) |
|---|---|---|---|---|
| Example 5 | 1:0.7 | 621 | 45 | 84 |
| Example 10 | 1:0.1 | 626 | 52 | 61 |
| Example 11 | 1:2.6 | 620 | 50 | 72 |

As can be seen from the results in Table 3, from the comparison of the quantum dot of Example 5 with the quantum dots of Examples 10 and 11, it could be confirmed that differences occur in the full width at half maximum and the luminous efficiency due to the differences in the content ratio of the Group III element and the active metal constituting the bandgap control layer.

Features, structures, and effects exemplified in each of the above-described embodiments may be combined or modified for other embodiments by those of ordinary skill in the art to which the embodiments belong. Accordingly, the contents related to such combinations and modifications should be interpreted as being included in the scope of the present disclosure.

The invention claimed is:

1. A Group III-V-based quantum dot comprising:
a seed which includes a Group III element, a Group V element, and an active metal having various oxidation numbers and in which a molar ratio of the Group III element and the active metal is 1:3 to 1:30, wherein the active metal is derived from a material represented by [Chemical Formula 1] of $T_xO_y(\text{carboxylate})_z$ when the seed is formed, wherein T is Zn, x, y, and z are natural numbers excluding zero, and x is greater than y, and wherein a shell is included on an outer surface of the seed, and the shell includes a Group VI element and a molar ratio of the Group VI element of the shell and a Group III element of the seed is 1:3 to 1:20.

2. The Group III-V-based quantum dot of claim 1, wherein the active metal further comprises material selected from the group consisting of Mn, Cu, Fe, Ni, Co, Cr, Ti, Zr, Nb, Mo, Ru, or a combination thereof.

3. The Group III-V-based quantum dot of claim 1, wherein the Group III-V-based quantum dot has a seed in which the molar ratio of the Group III element and the active metal is 1:3 to 1:20.

4. The Group III-V-based quantum dot of claim 1, wherein the molar ratio of the Group III element and the Group V element is 1:0.5 to 1:1.2.

5. The Group III-V-based quantum dot of claim 1, wherein the active metal, the Group III element, and the Group V element are alloy-bonded.

6. The Group III-V-based quantum dot of claim 1, wherein the shell is at least one selected from the group consisting of CdS, CdSe, CdTe, ZnS, ZnSe, ZnTe, ZnSeS, PbS, PbSe, PbSeS, PbTe, GaAs, GaP, InP, InGaP, InZnP, InAs, CuS, InN, GaN, InGaN, AlP, AlAs, InAs, GaSb, InSb, AlSb, HgS, HgTe, HgCdTe, ZnCdS, ZnCdSe, CdSeTe, CuInSe2, CuInS2, AgInS2, and SnTe.

7. A method of manufacturing a Group III-V-based quantum dot, the method comprising:
a precursor step of forming an active nanocluster including an active metal oxide-carboxylate of [Chemical Formula 1] of $T_xO_y(\text{carboxylate})_z$ obtained by performing thermal decomposing of an active metal-carboxylate, wherein T is Zn, x, y, and z are natural numbers excluding zero, and x is greater than y; and
a seed forming step of injecting Group III element precursor and Group V element precursor solutions into a precursor solution manufactured in the precursor step to thus form a seed in which an active metal, a Group III element, and a Group V element are alloyed.

8. The method of claim 7, wherein the active metal oxide-carboxylate further includes a compound of the [Chemical Formula 1], wherein T is Mn, Cu, Fe, Ni, Co, Cr, Ti, Zr, Nb, Mo, Ru, or a combination thereof x, y, and z are natural numbers excluding zero, and x is greater than y.

9. The method of claim 7, wherein the thermal decomposing is performed at 200 to 500° C.

10. The method of claim 7, wherein the seed forming step includes:
a step 2-1 of mixing and agitating an active nanocluster solution, the Group III element precursor solution, and a solvent;
a step 2-2 of increasing a temperature of a solution of the step 2-1 to 100 to 150° C. for 5 to 20 minutes while reducing a pressure to perform a reaction; and
a step 2-3 of increasing a temperature of a solution of the step 2-2 to 200 to 400° C. in an inert atmosphere and injecting the Group V element precursor solution.

* * * * *